(12) United States Patent
Koshy et al.

(10) Patent No.: US 10,826,564 B2
(45) Date of Patent: Nov. 3, 2020

(54) SYSTEM OF SIGNAL-OVER-POWER NETWORK ADAPTERS FOR LOW POWER NETWORKS

(71) Applicant: Nishil Thomas Koshy, Ernakulam (IN)

(72) Inventors: Nishil Thomas Koshy, Ernakulam (IN); Dhananjai Bajpai, Kanpur (IN)

(73) Assignee: Nishil Thomas Koshy, Ernakulam (IN)

(*) Notice: Subject to any disclaimer, the term of this patent is extended or adjusted under 35 U.S.C. 154(b) by 0 days.

(21) Appl. No.: 16/489,666

(22) PCT Filed: Feb. 28, 2018

(86) PCT No.: PCT/IN2018/050104
§ 371 (c)(1),
(2) Date: Aug. 28, 2019

(87) PCT Pub. No.: WO2018/158778
PCT Pub. Date: Sep. 7, 2018

(65) Prior Publication Data
US 2019/0386704 A1 Dec. 19, 2019

(30) Foreign Application Priority Data
Feb. 28, 2017 (IN) .............................. 201741007086

(51) Int. Cl.
*H04W 84/12* (2009.01)
*H04B 3/54* (2006.01)
*G06F 1/26* (2006.01)
*H04B 3/56* (2006.01)

(52) U.S. Cl.
CPC ............... *H04B 3/548* (2013.01); *G06F 1/26* (2013.01); *H04B 3/56* (2013.01); *H04B 2203/547* (2013.01); *H04B 2203/5483* (2013.01); *H04W 84/12* (2013.01)

(58) Field of Classification Search
USPC ........................................................ 375/257
See application file for complete search history.

(56) References Cited

U.S. PATENT DOCUMENTS

2016/0349765 A1* 12/2016 Woytowitz ................ G05F 1/12
2016/0352389 A1* 12/2016 Chong ...................... H04B 3/56
2016/0358722 A1* 12/2016 Lakshmanan ............ H01H 9/54
2017/0026194 A1* 1/2017 Vijayrao ............. H04L 12/2809

* cited by examiner

*Primary Examiner* — Eva Y Puente
(74) *Attorney, Agent, or Firm* — Barry Choobin; Patent 360 LLC (57) ABSTRACT

An integrated networking scheme that enables data communication and power delivery over a single connection for a network of low power devices spread across a local area is disclosed. The integrated networking scheme provides a simplified technique to transfer data signal and power signal using a single cable with power coupling/decoupling enabled through a bias T-network with diodes, which enable multi-point power injection. A special transistor-resistor network controls the received signal spectrum. The integrated networking scheme provides a signal over power adapter attached to each low power devices in the local area network to enable coupling and decoupling of data signal and power signal. The scheme provides wide-band data communication capabilities, enables plug-and-play power and data capabilities to remote devices.

15 Claims, 7 Drawing Sheets

FIG. 6

SYSTEM OF SIGNAL-OVER-POWER NETWORK ADAPTERS FOR LOW POWER NETWORKS

CROSS-REFERENCE TO RELATED APPLICATIONS

This application is a national phase application of the Patent Cooperation Treaty (PCT) international application with serial number PCT/IN2018/050104 filed in the Indian Patent Office on Feb. 28, 2018 with the title "A SYSTEM OF SIGNAL-OVER-POWER NETWORK ADAPTERS FOR LOW POWER NETWORKS", and claims the priority and the benefit of the Provisional Patent Application with serial number 201741007086, filed in the Indian Patent Office on Feb. 28, 2017, with the title "A SYSTEM OF SIGNAL-OVER-POWER NETWORK ADAPTERS FOR LOW POWER NETWORKS". The contents of both the Provisional Patent Application and the PCT international application are incorporated in their entirety by reference herein.

BACKGROUND

Technical Field

The embodiments herein are generally related to a system of an integrated networking scheme. The embodiments herein are particularly related to a system of an integrated networking scheme that enables data communication and power delivery over a single cable connection. The embodiments herein are more particularly related to a method for enabling a system of an integrated networking scheme that enables data communication and power delivery over a single cable connection for a network of low power devices spread across a local area.

Description of the Related Art

With increasing use of data communication devices, reducing the complexity of a data communication system is one of the key aspects of optimizing the performance of communication systems. For wired communication systems, one of the key areas of optimization is reducing the use of cables. One of the key areas of integrating for wired systems are integrating the transmission of power and data over a single connection.

Currently used methods include Power over Ethernet (PoE), Power Line Communication (PLC), Phantom Power and CATV. However, the current methods have certain drawbacks such as less range, complex circuit design requiring a plurality of AC/DC power adapters, lower power delivery capabilities, lesser data rates and narrow-band operation. These current methods fall short in range and ease of integration when it comes to using them in a modem use-case such as an Internet of Things (IoT) network.

Hence, there is a need for developing a simplified system and method to transfer signal and power using a single cable with higher range and a centralized control of power and data for an entire network of devices. There is also a need for a system and method to transfer signal and power using a single cable with high data transfer rates and provide a networking backbone to low power sensors and IoT devices with minimal overhead.

The above-mentioned shortcomings, disadvantages, and problems are addressed herein and which will be understood by reading and studying the following specification.

OBJECTIVES OF THE EMBODIMENTS HEREIN

The primary object of the embodiments herein is to provide an integrated networking scheme that enables data communication and power delivery over a single cable connection.

Another object of the embodiments herein is to provide an integrated networking scheme that enables data communication and power delivery over a single connection for a network of low power devices spread across a local area.

Yet another object of the embodiments herein is to provide a simple, cost-effective and efficient networking scheme that serves dual purposes of data communication and power delivery for a network of low power devices spread across a local area.

Yet another object of the embodiments herein is to provide a method for connecting a plurality of end nodes, gateway devices (hubs) and power supplies to a common network cable to provide integrated power and data transmission over a single cable.

Yet another object of the embodiments herein is to provide an integrated networking scheme that enables data communication and power delivery over a single connection with simplified cabling and moderate power delivery capability.

Yet another object of the embodiments herein is to provide an integrated networking scheme that enables data communication and power delivery over a single connection with multi-point power injection.

Yet another object of the embodiments herein is to provide an integrated networking scheme that enables data communication and power delivery over a single connection with wide-band data communication capabilities.

Yet another object of the embodiments herein is to provide an integrated networking scheme that enables plug-and-play power and data capabilities to remote devices, where no power outlets are available.

Yet another object of the embodiments herein is to provide centralized power and data control for an entire network of devices.

Yet another object of an exemplary embodiment herein is to provide a networking backbone for low power (1 Volt to 12 Volts, 1 mA to 500 mA) sensors and IoT devices for a range up to 500 meters with baud rates up to 10 Mbps.

These and other objects and advantages of the embodiments herein will become readily apparent from the following detailed description taken in conjunction with the accompanying drawings.

SUMMARY OF THE EMBODIMENTS HEREIN

The embodiments herein provide an integrated networking scheme that enables data communication and power delivery over a single connection for a network of low power devices spread across a local area. The embodiments also provide a simplified technique to transfer signal and power using a single cable with power coupling/decoupling enabled through a bias T-network with diodes, which permit multi-point power injection. A special transistor-resistor network controls the received signal spectrum.

According to an embodiment herein, a system for enabling multipoint power injection and data communication in a local area network is provided. The system comprising a plurality of network appliances, a plurality of power supplies, a network cable and a plurality of signal-over-power (SOP) adapters. The plurality of network appliances are connected to the local area network. The plurality of network appliances are low power network devices. The plurality of power supplies are configured for supplying power to the plurality of network appliances. The plurality of power supplies are connected to the local area network. The network cable is configured for transmitting power and data signals over the local area network. The local area network comprises the plurality of power supplies, the plurality of network appliances and gateway devices hooked on to the network cable. The plurality of network appliances and the gateway devices derives at least one of the power signal and the data signal from the network cable. The plurality of signal-over-power (SOP) adapters are configured for enabling multipoint power injection and data communication in the local area network. The SOP adapter is connected to each network appliance, each power supply and gateway device. Each SOP adapter performs one of coupling and decoupling of the data signal and the power signal using a bias T-network with diodes to perform multipoint power injection and a transistor-resistor network to control the frequency spectrum of the received data signal for enabling data communication.

According to an embodiment herein, the SOP network adapter comprises a power coupler/de-coupler module, an optional DC regulator, and a signal interface circuit. The power coupler/de-coupler module is configured for coupling/decoupling the data signal and the power signal. The power coupler/de-coupler module comprises the bias T network with diode to couple/de-couple the power signal and data signal. The optional DC regulator is configured to regulate the power signal received from the power coupler/de-coupler module as required for the network appliance deriving power from the network cable. The signal interface circuit comprising the transistor-resistor network is configured for controlling the frequency spectrum of the data signal received from the power coupler/de-coupler module for enabling data communication with network appliance in the local area network.

According to an embodiment herein, the power coupler/de-coupler module in the SOP adapter comprises the bias T network comprising a capacitor, an inductor and a diode. The capacitor is configured for allowing the data signal to pass through the bias T network. The power signal is a direct current (DC) signal. The inductor is configured for allowing the power to pass through the bias T network. The data signal is an alternating current (AC) signal. The diode is configured to block reverse currents that arise due to voltage differences between the plurality of power supplies across the network cable for protecting each power supply connected to the SOP adapter.

According to an embodiment herein, the signal interface circuit in the SOP adapter comprises a signal detector with the transistor-resistor network comprising a first resistor and a second variable resistor connected to a transistor. The first resistor connected to the transistor is configured for reducing noise of the data signal and protecting the transistor. The second variable resistor connected to the transistor is configured for controlling the frequency spectrum of the data signal.

According to an embodiment herein, the power coupler/de-coupler module in the SOP adapter performs coupling by multiplexing the data signal passing through the capacitor and power signal passing through the inductor onto the network cable.

According to an embodiment herein, the power coupler/de-coupler module in the SOP adapter performs decoupling by passing the power signal across the inductor and passing the data signal via the capacitor to the signal interface module while blocking the power.

According to an embodiment herein, the optional regulator is connected in to the power de-coupler module when the network appliance requires a specific regulated DC voltage.

According to an embodiment herein, the signal interface is one of a half-duplex system and a full duplex system depending on the communication requirements of the network appliances in the local area network.

According to an embodiment herein, each network appliance among the plurality of network appliances is capable of receiving at least one of a power and data signal from the network cable through the SOP adapter.

According to an embodiment herein, a method of enabling multipoint power, injection and data communication in a local area network is provided. The method includes sending a data signal from a first network appliance among a plurality of network appliance connected to a network cable in the local area network. The method further includes providing a power from a power supply source among a plurality of power supplies connected to the network cable in the local area network. The method further includes coupling the data signal and power using a bias T network in an SOP adapter connected to the first network appliance and the power supply source. The method includes transmitting coupled data signal and power over the network cable. The method further includes decoupling data signal and power signal using a bias T network in each SOP adapter connected to each network appliance among the plurality of network appliances receiving at least one of the power signal and data signal from the network cable. Further, the method includes receiving the power signal at a plurality of points in the local area network by each network appliance after regulating the power to a specified DC voltage as required by each network appliance using an optional regulator module in the SOP adapter. Furthermore, the method includes receiving the data signal decoupled by the SOP adapter by the network appliance after adjusting the frequency spectrum of the received data signal using a transistor-resistor network in a signal interface module in the SOP adapter.

According to an embodiment herein, the coupling of data signal and power is performed by multiplexing the data signal passing through a capacitor and power passing through an inductor in the bias T network in the SOP adapter.

According to an embodiment herein, the decoupling of data signal and power is performed by passing the power across the inductor and passing the data signal via the capacitor to a signal interface module while blocking the power.

According to an embodiment herein, the adjusting of frequency spectrum of a received data signal is performed by varying the value of a variable resistor in the transistor-resistor network.

According to an embodiment herein, the method further comprises blocking reverse currents that arise due to voltage differences between the plurality of power supplies across the network cable for protecting the power supply using a diode in the power coupler module in the SOP adapter.

According to an embodiment herein, the method enables rapidly deploying of power and data communication across the plurality of network appliances from the network cable in a local area network for typical Internet of Things (IoT) type applications.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the scope thereof, and the embodiments herein include all such modifications.

BRIEF DESCRIPTION OF THE DRAWINGS

The other objects, features, and advantages will be apparent to those skilled in the art from the following description of the preferred embodiment herein and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide an integrated networking scheme that enables data communication and power delivery over a single connection for a network of low power devices spread across a local area. The embodiments also provide a simplified technique to transfer signal and power using a single cable with power coupling/decoupling enabled through a bias T-network with diodes, which permit multi-point power injection. A special transistor-resistor network controls the received signal spectrum.

According to an embodiment herein, a system for enabling multipoint power injection and data communication in a local area network is provided. The system comprising a plurality of network appliances, a plurality of power supplies, a network cable and a plurality of signal-over-power (SOP) adapters. The plurality of network appliances are connected to the local area network. The plurality of network appliances are low power network devices. The plurality of power supplies are configured for supplying power to the plurality of network appliances. The plurality of power supplies are connected to the local area network. The network cable is configured for transmitting power and data signals over the local area network. The local area network comprises the plurality of power supplies, the plurality of network appliances and gateway devices hooked on to the network cable. The plurality of network appliances and the gateway devices derives at least one of the power signal and the data signal from the network cable. The plurality of signal-over-power (SOP) adapters are configured for enabling multipoint power injection and data communication in the local area network. The SOP adapter is connected to each network appliance, each power supply and gateway device. Each SOP adapter performs one of coupling and decoupling of the data signal and the power signal using a bias T-network with diodes to perform multipoint power injection and a transistor-resistor network to control the frequency spectrum of the received data signal for enabling data communication.

According to an embodiment herein, the SOP network adapter comprises a power coupler/de-coupler module, an optional DC regulator, and a signal interface circuit. The power coupler/de-coupler module is configured for coupling/decoupling the data signal and the power signal. The power coupler/de-coupler module comprises the bias T network with diode to couple/decouple the power signal and data signal. The optional DC regulator is configured to regulate the power signal received from the power coupler/de-coupler module as required for the network appliance deriving power from the network cable. The signal interface circuit comprising the transistor-resistor network is configured for controlling the frequency spectrum of the data signal received from the power coupler/de-coupler module for enabling data communication with network appliance in the local area network.

According to an embodiment herein, the power coupler/de-coupler module in the SOP adapter comprises the bias T network comprising a capacitor, an inductor and a diode. The capacitor is configured for allowing the data signal to pass through the bias T network. The power signal is a direct current (DC) signal. The inductor is configured for allowing the power to pass through the bias T network. The data signal is an alternating current (AC) signal. The diode is configured to block reverse currents that arise due to voltage differences between the plurality of power supplies across the network cable for protecting each power supply connected to the SOP adapter.

According to an embodiment herein, the signal interface circuit in the SOP adapter comprises a signal detector with the transistor-resistor network comprising a first resistor and a second variable resistor connected to a transistor. The first resistor connected to the transistor is configured for reducing noise of the data signal and protecting the transistor. The second variable resistor connected to the transistor is configured for controlling the frequency spectrum of the data signal.

According to an embodiment herein, the power coupler/de-coupler module in the SOP adapter performs coupling by multiplexing the data signal passing through the capacitor and power signal passing through the inductor onto the network cable.

According to an embodiment herein, the power coupler/de-coupler module in the SOP adapter performs decoupling by passing the power signal across the inductor and passing the data signal via the capacitor to the signal interface module while blocking the power.

According to an embodiment herein, the optional regulator is connected in to the power de-coupler module when the network appliance requires a specific regulated DC voltage.

According to an embodiment herein, the signal interface is one of a half-duplex system and a full duplex system depending on the communication requirements of the network appliances in the local area network.

According to an embodiment herein, each network appliance among the plurality of network appliances is capable of receiving at least one of a power and data signal from the network cable through the SOP adapter.

According to an embodiment herein, a method of enabling multipoint power injection and data communication in a local area network is provided. The method includes sending a data signal from a first network appliance among a plurality of network appliance connected to a network cable in the local area network. The method further includes providing a power from a power supply source among a plurality of power supplies connected to the network cable in the local area network. The method further includes coupling the data signal and power using a bias T network in an SOP adapter connected to the first network appliance and the power supply source. The method includes transmitting coupled data signal and power over the network cable. The method farther includes decoupling data signal and power signal using a bias T network in each SOP adapter connected to each network appliance among the plurality of network appliances receiving at least one of the power signal and data signal from the network cable. Further, the method includes receiving the power signal at a plurality of points in the local area network by each network appliance after regulating the power to a specified DC voltage as required by each network appliance using an optional regulator module in the SOP adapter. Furthermore, the method includes receiving the data signal decoupled by the SOP adapter by the network appliance after adjusting the frequency spectrum of the received data signal using a transistor-resistor network in a signal interface module in the SOP adapter.

According to an embodiment herein, the coupling of data signal and power is performed by multiplexing the data signal passing through a capacitor and power passing through an inductor in the bias T network in the SOP adapter.

According to an embodiment herein, the decoupling of data signal and power is performed by passing the power across the inductor and passing the data signal via the capacitor to a signal interface module while blocking the power.

According to an embodiment herein, the adjusting of frequency spectrum of a received data signal is performed by varying the value of a variable resistor in the transistor-resistor network.

According to an embodiment herein, the method further comprises blocking reverse currents that arise due to voltage differences between the pluralities of power supplies across the network cable for protecting the power supply using a diode in the power coupler module in the SOP adapter.

According to an embodiment herein, the method enables rapidly deploying of power and data communication across the plurality of network appliances from the network cable in a local area network for typical Internet of Things (IoT) type applications.

According to an embodiment herein, an integrated networking scheme is provided, which enables data communication and power delivery over a single connection for a network of low power devices spread across a local area. The system enables a multi-point power injection over a simplified cabling with moderate power delivery capability. The system also enables a wide-band data communication capability along with power.

According to an embodiment herein, a system and method for providing a simple, cost effective and efficient networking scheme that serves the dual purposes of data communication and power delivery for a network of low power devices spread across a local area, is provided. The present embodiment enables setting up a local area network of low power devices and provides a method to connect a plurality of end nodes, gateway devices (hubs) and power supplies to a common network cable. The embodiment herein greatly simplifies cabling and power supply requirements as only a common cable is required. The plurality of network appliances and gateway are configured to derive power from the network cable as opposed to having their own dedicated power supplies. A signal-over-power (SOP) network adapter (isolator circuit) provides a means for rapidly deploying an array of sensors and/or devices in a local area for typical Internet of Things (IoT) type applications.

According to an embodiment herein, a signal-over-power (SOP) network adapter is provided. The SOP network adaptor comprises a power coupler or de-coupler, an optional DC regulator and a signal interface circuit. In an exemplary embodiment, two or more network appliances are connected to a common network cable and one of the appliances derives power from the common cable. A DC power supply is connected to the power coupler at one end of the network cable. The power coupler multiplexes AC signals (data signal) through a capacitor and DC power (power signal) through an inductor onto the common node connected to the network cable. A diode ensures that when multiple power couplers are connected, the different power supplies are not impacted by reverse currents that arise due to voltage differences between the power supplies or across the network cable. At the dc-coupler end, the DC power transfers across a second inductor while a second capacitor blocks the DC voltage and passes only the AC signal to the signal interface circuit. The power de-coupler also comprises an optional regulator circuit when a connected network appliance requires a specific regulated DC voltage.

According to an embodiment of the present invention, a signal interface for a half-duplex system implemented through a time division multiplexer is provided. A signal interface module is half-duplex or full-duplex depending on the communication requirements of the networked system. The present invention enables direct baseband signaling and radio frequency (RF) modulation techniques to increase noise tolerance or run multiple channels. The unique signal detector formed by two resistors and a transistor generates an AC signal corresponding to the signal received from the network cable. While the first resistor serves the dual purposes of reducing signal noise and protecting the transistor, the second resistor controls the frequency spectrum of the detected AC signal. A lower cut-off frequency of the detected signal is increased by reducing the value of the second resistor.

According to an embodiment of the present invention, a signal interface for a full-duplex system implemented through a frequency division multiplexer or code division multiplexer is provided. A unique signal detector formed by two resistors and a transistor generates an AC signal corresponding to the signal received from the network cable. While the first resistor serves the dual purposes of reducing signal noise and protecting the transistor, the second resistor controls the frequency spectrum of the detected AC signal. The signal detector also comprises optional components such as a third and fourth resistors for providing a specific bias to the transistor in the detection circuit. A capacitor ensures that only the detected AC signal passes to a low noise amplifier and the DC bias is blocked.

Figure 1:
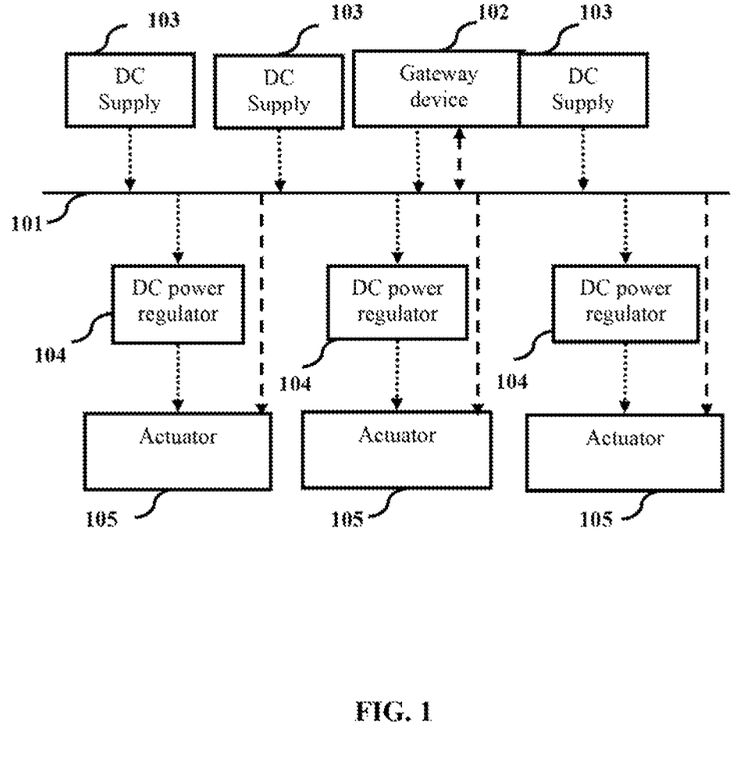
FIG. 1 illustrates a functional block diagram of a system of signal-over-power network adapters for low power networks, according to one embodiment herein.

FIG. 1 illustrates a block circuit diagram of a system of signal-over-power network adapters for low power networks, in an integrated networking scheme, according to one embodiment herein. The integrated networking scheme comprises a network cable 101, a gateway device 102, a plurality of Direct current (DC) supplies 103, a plurality of DC power regulators 104 and a plurality of actuators 105. The plurality of DC supplies 103 provide power to common network cable 101. The data signal is supplied from the gateway device 102. The gateway device provides data signal required to be transmitted to the plurality of actuators 105. The power and data signals are coupled and is provided to the network cable 101. Each actuator among the plurality of actuators 105 receives both data signal and power from the network cable 101. The data signals are decoupled from the network cable 101 and provided to the actuator 105.

With respect to FIG. 1, the network cable connections are illustrated with continuous lines, the data connections are illustrated with staggered lines and power transmission connections are illustrated with dotted lines. The staggered lines shown in FIG. 1 illustrates the transmission of data signal. Further, the power is decoupled from the network cable 101 and is supplied to the each actuator 105 via the DC power regulator 104. The DC power regulator 104 converts the power to a specific regulated DC voltage as required by each actuator 105. Thus the integrated network scheme enables both power and data transmission over a single network cable 101.

Figure 2A:
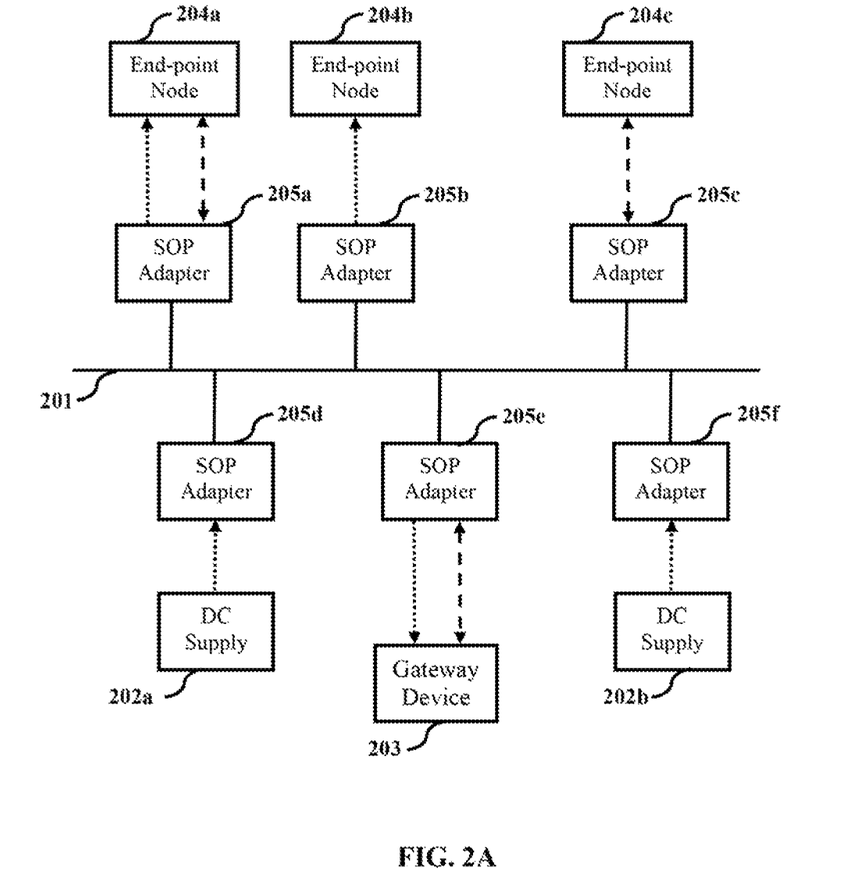
FIG. 2A illustrates a functional block diagram of a system of signal-over-power network adapters for low power networks connected to a common network cable comprising three nodes configured to receive data and power, power and data respectively, according to one embodiment herein.
Figure 2B:
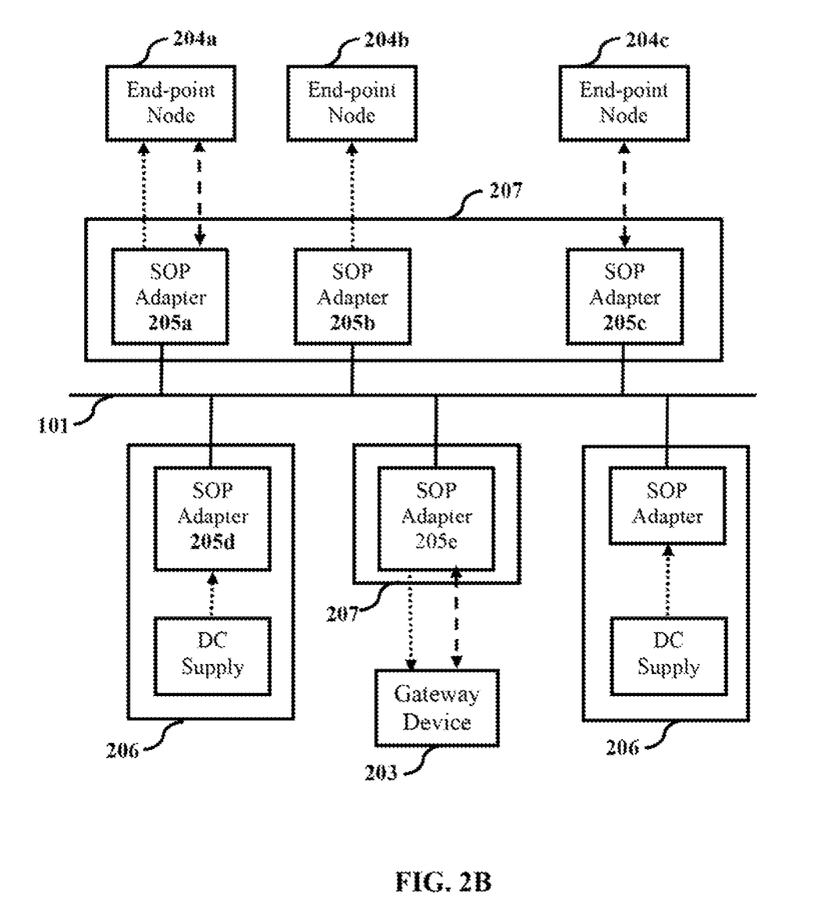
FIG. 2B illustrates a functional block circuit diagram of a system of signal-over-power network adapters for low power networks a local area network of low power devices connected to a common network cable comprising three end point devices configured to receive data and power, power and data respectively, according to one embodiment herein.

FIG. 2A illustrates a functional block diagram of a system of signal-over-power network adapters for low power networks connected to a common network cable comprising three nodes configured to receive data and power, power and data respectively, according to one embodiment herein. FIG. 2B illustrates a functional block circuit diagram of a system of signal-over-power network adapters for low power networks a local area network of low power devices connected to a common network cable comprising three end point devices configured to receive data and power, power and data respectively, according to one embodiment herein.

With respect to FIG. 2A-2B, the integrated networking scheme implemented in the local area network of low power devices is explained. The local area network comprises a network cable 201, a plurality of DC supplies 202a, 202b . . . 202n, a gateway device 203, a plurality of end-point nodes 204a, 204b . . . 204n and a plurality of Signal over Power (SOP) adapters 205a, 205b . . . 205n. Each DC supply, gateway device and end-point node comprises a dedicated SOP adapter connected to it. The plurality of end-point nodes 204a, 204b . . . 204n are peripheral devices/input-output devices in a local area network. The examples of plurality of end-point nodes 204a, 204b . . . 204n includes various (different) types of network appliances including but not limited to sensors, IoT devices and the like.

In FIG. 2B, the SOP adapter 205e is represented as a power and data coupler cum decoupler unit 207. The power and data coupler cum decoupler unit 207 separates power and data signal fed to the gateway device 203. Further, the data and power coupler unit 207 transmits the coupled power and data signal to the network cable 201. The SOP network adapter 205a, the SOP network adapter 205b, the SOP network adapter 205c connected to the plurality of end point nodes 204a, 204b and 204c and the SOP network adapter 205e connected to the gateway device 203 are collectively referred to as data and power coupler and de-coupler unit 207. The data and power coupler and de-coupler unit 207 is configured to enable a coupling and decoupling of the power and data signals.

The plurality of end-point nodes 204a, 204b . . . 204n and the gateway device 203 are configured to derive power from the network cable 201 as opposed to having their own dedicated power supplies. The data and power coupler and de-coupler unit 207 comprise a plurality of SOP adapters 205a, 205b . . . 205n, which are configured to enable a rapid deployment of a plurality of end-point nodes 204a, 204b . . . 204n in a local area network for typical Internet of Things (IoT) type applications. In FIG. 2A-2B an exemplary scenario is illustrated. The end-point node 204a receives both data signal and power from the network cable 201. The SOP adapter 205a connected to the end-point node 204a decouples power and data signal transmitted over the network cable 201. The decoupled power and data signal are provided to the end-point node 204a. Further, the end-point node 204b receives power from the network cable 201. The SOP adapter 205b connected to the end-point node 204b decouples power from the signal transmitted over the network cable 201 and provides the decoupled power to the end-point node 204b. Similarly the end-point node 204c receives data signal from the network cable 201. The SOP adapter 205c connected to the end-point node 204c decouples data signal from the signal transmitted over the network cable 201 and provides the decoupled data signal to the end-point node 204c. With reference to FIG. 2A-2B, the network cable connections are illustrated with continuous lines, the data connections are illustrated with staggered lines and power transmission connections are illustrated with dotted lines.

Figure 3:
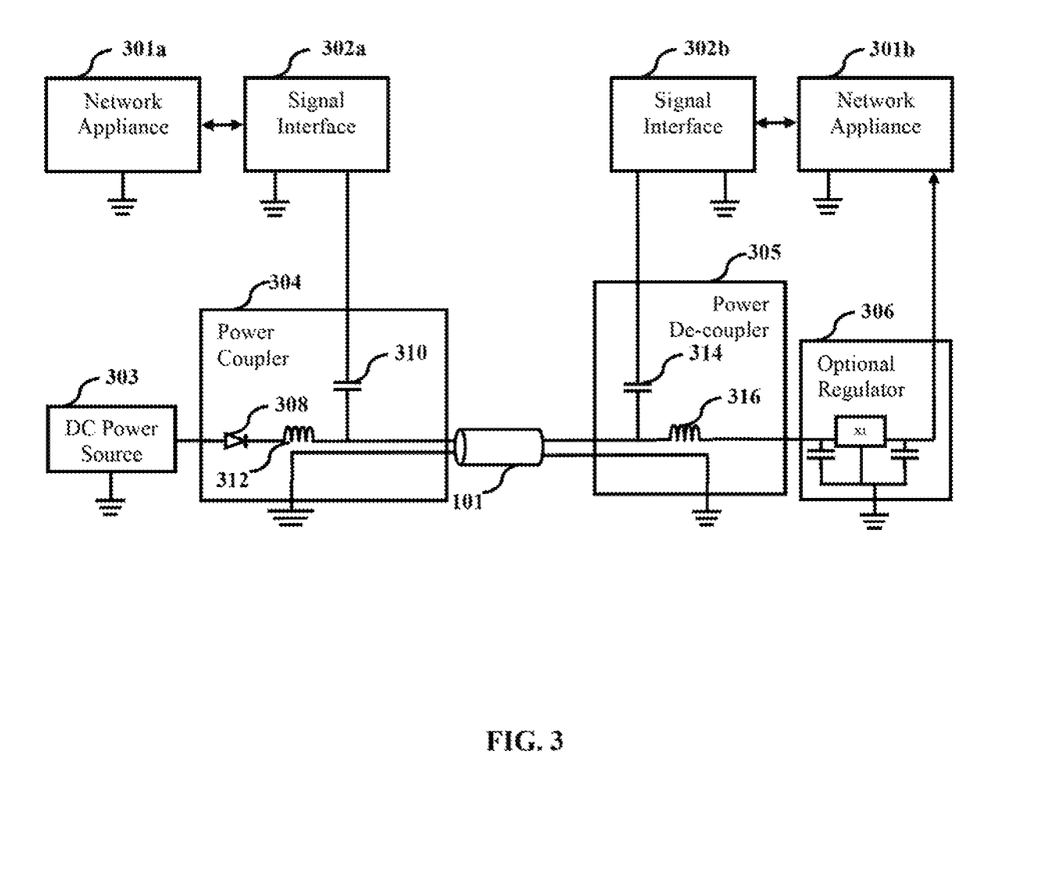
FIG. 3 illustrates a block circuit diagram of a signal over power adapter enabling power coupling and de-coupling in a local area network, according to one embodiment herein.

FIG. 3 illustrates a block circuit diagram of a signal over power adapter enabling power coupling and de-coupling in a local area network, according to one embodiment herein. The local area network comprises a network cable 101, a plurality of network appliances 301, a DC power source 303 and a plurality of SOP adapters. Each SOP adapter comprises a power coupler/de-coupler module, a signal interface module and an optional regulator module. According to an embodiment herein, the system comprises two network appliances 301a and 301b connected to a network cable 101. One of the network appliances 301b derives power and data signal from the network cable 101.

A first SOP adapter connected to the first network appliance 301a couples data signal received from the first network appliance 301a through the signal interface 302a and power received from the DC power source 303 in the coupler unit 304. Further the coupled signal is transmitted over the network cable 101. The first SOP adapter comprises a power coupler 304 and a first signal interface module 302a. The DC power supply 303 is connected to the power coupler 304 at one end of the network cable 101. The power coupler 304 comprises a diode 308, a first capacitor 310 and a first inductor 312 acting as a bias T network. The power coupler 304 multiplexes data signals (AC signals) from the first network appliance 301a through the first capacitor 310 and power signal (DC signal) through the first inductor 312 onto the common node connected to the common network cable 101. The diode 308 ensures that the plurality of power supplies are not impacted by reverse currents that arise due to voltage differences between the plurality of power supplies or across the network cable 101 when a plurality of power couplers are connected.

Further, a second SOP adapter is connected to the second network appliance 301b. The second SOP adapter comprises a power de-coupler 305, an optional regulator module 306 and a second signal interface module 302b. The power de-coupler 305 comprises a second capacitor 314 and a second inductor 316 acting as a bias T network. The second SOP module derives signal from the network cable 101 and transmits power and data signal to the second network appliance 301b. At the second SOP module, the power is transferred across a second inductor 316. The second capacitor 314 blocks the power and passes only the data signal to the signal interface module 302b. The power de-coupler 305 is connected to an optional regulator module 306 when the second network appliance 301b requires a specific regulated DC voltage. Thus, the second network appliance 301b derives the data signal transmitted from the first network appliance 301a and power from the network cable 101. The signal interface modules 302a and 302b are one of a full duplex system and a half duplex system depending on the communication requirements of the networked system.

Figure 4:
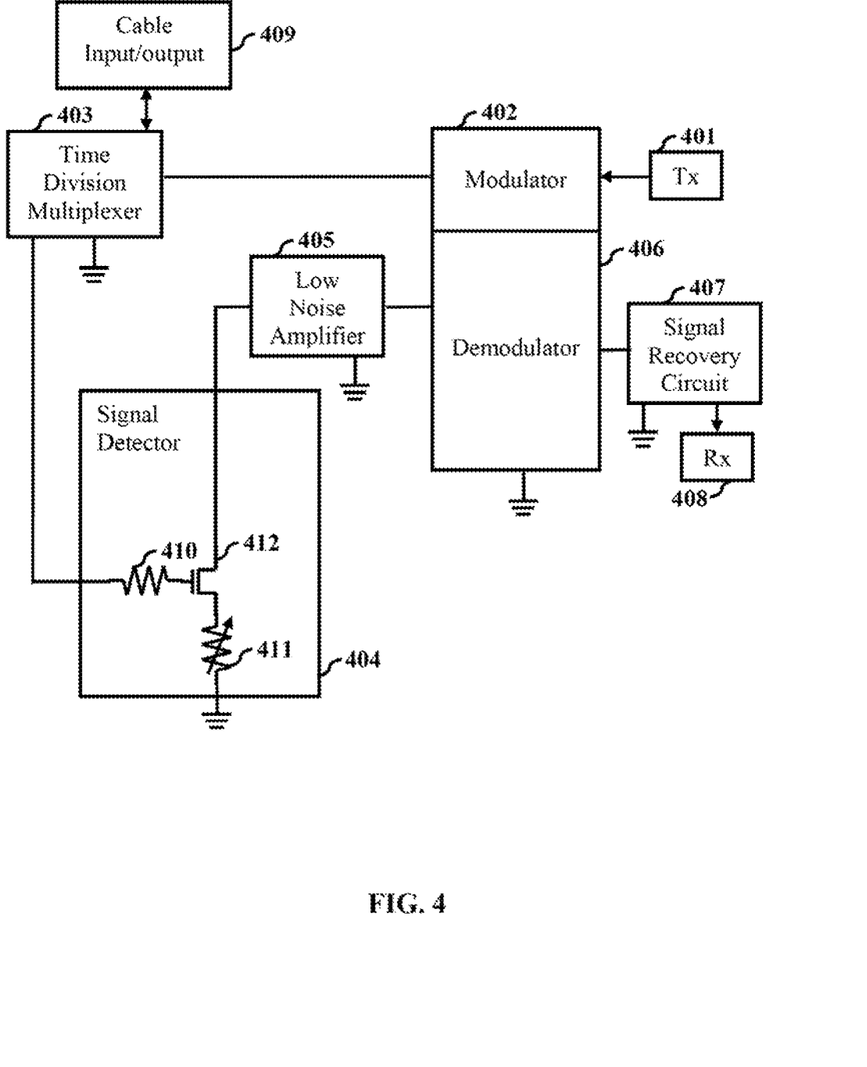
FIG. 4 illustrates a block circuit diagram of a signal over power adapter enabling power coupling and de-coupling in a local area network with a half-duplex system acting as a signal interface, according to one embodiment herein.

FIG. 4 illustrates a block circuit diagram of a signal over power adapter enabling power coupling and de-coupling in a local area network with a half-duplex system acting as a signal interface, according to one embodiment herein. FIG. 4 illustrates a half-duplex system acting as a signal interface. The half-duplex system comprises a transmitter 401, a modulator 402, a time division multiplexer 403, a signal detector 404, a low noise amplifier 405, a demodulator 406, a signal recovery circuit 407, a receiver 408 and a cable input/output 409. The half-duplex system is connected to a network appliances as a signal interface. The half-duplex system is operated in a transmission mode or receiving mode. The system acts as a transmitter in one half cycle and receiver in another half cycle.

In the transmission mode, the transmitter 401 provides the AC signal (data signal) to the modulator 402. The transmitter 401 is a network appliance transmitting a data signal over the network cable. The modulator 402 modulates the AC signal. The modulated AC signal (output signal) is further transmitted onto the network cable via the cable input/output 409 through the time division multiplexer 403. Similarly, in the receiving mode, the cable input/out 409 derives an input signal from the network cable and provides the input signal to the signal detector 404 through the time division multiplexer 403. The signal detector 404 generates an AC signal corresponding to the input signal received by cable input/output 409 from the network cable. The signal detector 404 comprises a transistor-resistor network including a first resistor 410, a second variable resistor 411 and a transistor 412. The first resistor 410 in the signal detector 404 serves the dual purposes of reducing signal noise and protecting the transistor 412. The second variable resistor 411 in the signal detector 404 controls the frequency spectrum of the detected AC signal. A lower cut-off frequency of the detected signal is increased by reducing the value of the second variable resistor 411.

Further, the detected AC signal is provided to a low noise amplifier 405. The low noise amplifier amplifies the detected AC signal and provides the amplified AC signal to the demodulator 406. The demodulator is configured to demodulate the amplified AC signal to generate the actual data signal. The signal recovery circuit 407 recovers the actual data signal and provides the recovered data signal to the receiver 408.

Figure 5:
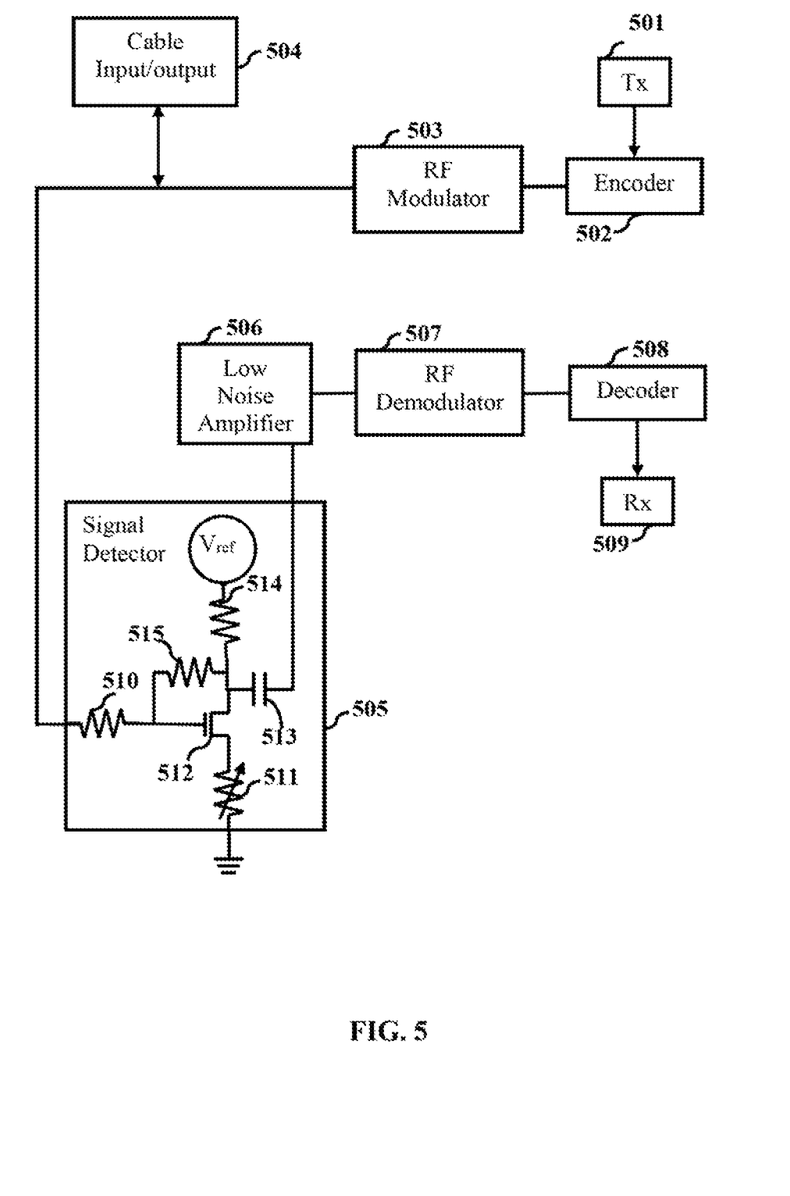
FIG. 5 illustrates a block circuit diagram of a signal over power adapter enabling power coupling and de-coupling in a local area network with full-duplex/FDMA/CDMA system acting as a signal interface, according to one embodiment herein.

FIG. 5 illustrates a block circuit diagram of a signal over power adapter enabling power coupling and de-coupling in a local area network with full-duplex/FDMA/CDMA system acting as a signal interface, according to one embodiment herein. FIG. 5 illustrates a full-duplex system acting as a signal interface circuit. The full-duplex system comprises a transmitter 501, an encoder 502, a RF modulator 503, a cable input/output 504, a signal detector 505, a low noise amplifier 506, a RF demodulator 507, a decoder 508 and a receiver 509. The full-duplex system is connected to a network appliance in a local area network. The full-duplex system is configured to act as a signal interface for the network appliance. The full duplex system enables the network appliance to transmit and receive data from a network cable in the local area network simultaneously.

During a transmission mode, the transmitter 501 receives and transmits the data signal in the form of an AC signal. The AC signal is fed to the encoder 502. The encoder 502 further provides the encoded AC signal to the RF modulator 503. The RF modulator 503 performs a modulation of the AC signal. The modulated AC signal is further transmitted through the network cable via the cable input/output 504.

During a receiving mode, the data signal from the network cable is received through the cable input/output 504. The data signal is further provided to the signal detector 505. The signal detector 505 generates an AC signal corresponding to the data signal received by cable input/output 504 from the network cable. The signal detector comprises transistor-resistor network with a first resistor 510, a second variable resistor 511, a transistor 512 and a capacitor 513. The first resistor 510 in the signal detector 505 is configured to serve the dual purposes of reducing signal noise and protecting the transistor 512. The second variable resistor 511 in the signal detector 505 controls the frequency spectrum of the detected AC signal. The signal detector 505 also comprises optional components such as a third resistor 514 and fourth resistor 514 for providing a specific bias to the transistor 512 in the detection circuit. The fourth resistor 514 is connected to a reference voltage, Vref.

The capacitor 513 ensures that only the detected AC signal is passed to a low noise amplifier 506 and the DC bias is blocked. The low noise amplifier 506 is configured to amplify the AC signal and provide the amplified AC signal to the RF demodulator 507. The RF demodulator 507 demodulates the AC signal and provides the demodulated AC signal to a decoder 508. The decoder 508 decodes the AC signal to obtain the actual data signal. The data signal is then provided to the network appliance acting as the receiver 509.

Figure 6:
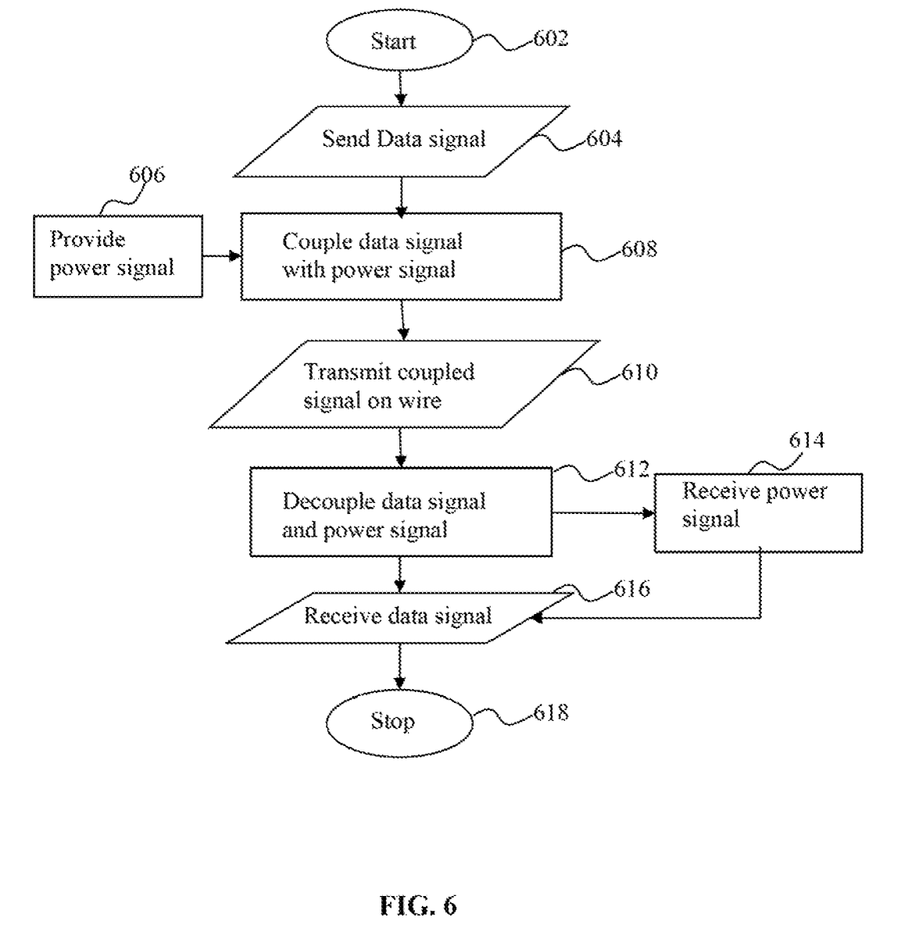
FIG. 6 illustrates flowchart explaining a method of enabling data communication and power delivery over a single cable connection in a local area network, according to one embodiment herein.

FIG. 6 illustrates flowchart explaining a method of enabling data communication and power delivery over a single cable connection in a local area network, according to one embodiment herein. The local area network comprises a plurality of network appliances connected to the network cable. Each of the plurality of network appliances is capable of deriving power or data signals or both from the network cable. A data is received through a gateway device or signal interface (602). The received data signal from a first network appliance is sent in the local area network (604). The first network appliance sends the data signal over the network cable via an SOP adapter. The first network appliance makes use of a full duplex system or a half-duplex system as a signal interface to send data signal.

Further, the method includes receiving a power from a DC power supply in the local area network (606). The received data signal and power are coupled together (608). The coupling is performed by the SOP adapter connected to the first network appliance and the DC power supply. The coupling is performed using a bias T network in an SOP adapter connected to the first network appliance and the DC power supply. The coupling is performed by multiplexing the data signal passing through a capacitor and power passing through an inductor in the bias T network in the SOP adapter. The data signal and power coupled by the SOP adapter is provided to the network cable. The coupled power and data signals is transmitted over the network cable (610). The coupled data signal and power signal is transmitted by adjusting the frequency spectrum of the received data signal using a transistor-resistor network in a signal interface module in the SOP adapter. The plurality of network appliances connected to the network cable is configured to derive power or data signal or both from the network cable. Each of the plurality of network appliances comprises an SOP adapter connected to it.

The data signal and power are separated/decoupled from the coupled signal transmitted over the network cable (612). The data signal and power are decoupled/separated using a bias T network in each SOP adapter connected to each network appliance among the plurality of network appliances receiving power from at least one of the power supplies and data signal from the network cable. The SOP adapter connected to each network appliance decouples power signal and data signal based on the needs. The method includes receiving the power from the SOP adapter (614). The power is received and injected at multiple points in the local area network by different network appliances after regulating the power to a specified DC voltage as required by each network appliance using an optional regulator module in the SOP adapter.

Further, the data signal is received from the SOP adapter (616). The data signal is decoupled by each SOP adapter using a special transistor-resistor network to control the frequency spectrum of the data signal received by each network appliance. The SOP adapter connected to each network appliance is configured to provide the power or data signal selectively based on the need of the network appliance (618).

Therefore the embodiments provided herein, provide an integrated networking scheme that enables data communication and power delivery over a single connection for a network of low power devices spread across a local area. The embodiments herein also provide a simplified technique to transfer data signal and power using a single cable with a power coupling/decoupling enabled through a bias T-network with diodes, which permit multi-point power injection. A special transistor-resistor network controls the received signal spectrum. The embodiments herein provide an integrated networking scheme that enables data communication and power delivery over a single connection with multipoint power injection and wide-band data communication capabilities. The embodiments herein enables plug-and-play power and data capabilities to remote devices, where no power outlets are available, by providing a centralized power and data control for an entire network of devices. According to one embodiment herein, the system provides a networking backbone for low power sensors (1 Volt to 12 Volt, 1 mA to 500 mA) and IoT devices for ranges up to 500 meters with baud rates up to 10 Mbps.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A system for enabling multipoint power injection and data communication in a local area network, the system comprising:
   a plurality of network appliances connected to the local area network, and wherein the plurality of network appliances are low power network devices;
   a plurality of power supplies configured for supplying power to the plurality of network appliances, and wherein the plurality of power supplies are connected to the local area network;
   a network cable configured for transmitting a power signal and a data signal over the local area network, and wherein the local area network comprises the plurality of power supply devices, the plurality of network appliances and gateway devices connected on to the network cable, and wherein the plurality of network appliances and the plurality of gateway devices are configured to derive at least one of the power signal and the data signal from the network cable; and
   a plurality of signal-over-power (SOP) adapters configured for enabling multipoint power injection and data communication in the local area network, and wherein an SOP adapter is connected to each network appliance, each power supply and gateway device, and wherein each SOP adapter is configured to perform any one of coupling and decoupling of the data signal and the power signal using a bias T-network with diodes to perform multipoint power injection and a transistor-resistor network to control a frequency spectrum of the data signal for achieving a data communication.

2. The system as claimed in claim 1, wherein the SOP adapter comprises:
   a power coupler/de-coupler module configured for coupling/decoupling the data signal and the power signal, wherein the power coupler/de-coupler module comprises the bias T network with diode to couple/decouple the power signal and data signal;
   an optional DC regulator configured to regulate the power signal received from the power coupler/de-coupler module based on a requirement for the network appliance deriving power from the network cable; and
   a signal interface circuit comprising the transistor-resistor network configured for controlling the frequency spectrum of the data signal received from the power coupler/de-coupler module for enabling data communication with network appliance in the local area network.

3. The system as claimed in claim 2, wherein the power coupler/de-coupler module in the SOP adapter comprises the bias T network comprising:
   an inductor configured for allowing the power signal to pass through the bias T network, wherein the power signal is a direct current signal;
   a capacitor configured for allowing the data signal to pass through the bias T network, wherein the data signal is an alternating current signal; and
   a diode configured to block reverse currents that arise due to voltage differences between the plurality of power supplies across the network cable for protecting each power supply connected to the SOP adapter.

4. The system as claimed in claim 2, wherein the signal interface circuit in the SOP adapter comprises a signal detector with the transistor-resistor network comprising:
   a first resistor connected to the transistor for reducing signal noise of the data signal and protecting the transistor; and
   a second variable resistor connected to the transistor for controlling the frequency spectrum of the data signal.

5. The system as claimed in claim 2, wherein the power coupler/de-coupler module in the SOP adapter is configured to perform a coupling process/operation by multiplexing the data signal passing through the capacitor and power signal passing through the inductor onto the network cable.

6. The system as claimed in claim 2, wherein the power coupler/de-coupler module in the SOP adapter is configured to perform a decoupling process/operation by passing the power signal across the inductor and passing the data signal via the capacitor to the signal interface module while blocking the power signal.

7. The system as claimed in claim 2, wherein the optional regulator is connected to the power coupler/de-coupler module, when the network appliance requires a specific regulated DC voltage.

8. The system as claimed in claim 2, wherein the signal interface is any one of a half-duplex system and a full duplex system depending on a communication requirement of the network appliances in the local area network.

9. The system as claimed in claim 1, wherein each network appliance among the plurality of network appliances is configured to receive at least one of a power and data signal from the network cable through the SOP adapter.

10. A method of enabling multipoint power injection and data communication in a local area network, the method comprising:
   sending a data signal from a first network appliance among a plurality of network appliance connected to a network cable in the local area network;
   providing a power signal from a power supply source among a plurality of power supplies connected to the network cable in the local area network;
   coupling the data signal and power signal using a bias T network in a plurality of signal-over-power (SOP) adapter connected to the first network appliance and the power supply source;
   transmitting coupled data signal and power signal over the network cable;
   decoupling data signal and power signal using a bias T network in each SOP adapter connected to each network appliance among the plurality of network appliance receiving at least one of the power signal and data signal from the network cable;
   receiving the power signal at multiple points in the local area network by each network appliances after regulating the power signal to a specified DC voltage as required by each network appliances using an optional regulator module in the SOP adapter; and
   receiving the data signal decoupled by the SOP adapter by the network appliance after adjusting the frequency spectrum of the data signal using a transistor-resistor network in a signal interface module in the SOP adapter.

11. The method as claimed in claim 10, wherein the coupling of data signal and power signal is performed by multiplexing the data signal passing through a capacitor and power signal passing through an inductor in the bias T network in the SOP adapter.

12. The method as claimed in claim 10, wherein the decoupling of data signal and power signal is performed by passing the power signal across the inductor and passing the data signal via the capacitor to a signal interface module while blocking the power signal.

13. The method as claimed in claim 10, wherein the adjusting of frequency spectrum of a data signal is performed by varying the value of a variable resistor in the transistor-resistor network.

14. The method as claimed in claim 10, further comprises blocking reverse currents that arise due to voltage differences between the plurality of power supplies across the network cable for protecting the power supply using a diode in the power coupler/de-coupler module in the SOP adapter.

15. The method as claimed in claim 10, comprises rapidly deploying of power and data communication across the plurality of network appliances from the network cable in a local area network for typical Internet of Things (IoT) type applications.

* * * * *